United States Patent [19]

Fialon

[11] Patent Number: 4,854,559
[45] Date of Patent: Aug. 8, 1989

[54] SUSPENSION ARM FOR THE TUB OF A LAUNDRY WASHING MACHINE

[75] Inventor: Bernard Fialon, Ailly-Sur-Somme, France

[73] Assignee: U.S. Philips Corp., New York, N.Y.

[21] Appl. No.: 107,072

[22] Filed: Oct. 8, 1987

[30] Foreign Application Priority Data

Oct. 17, 1986 [FR] France ................. 86 14440

[51] Int. Cl.⁴ ................. F16F 1/06; F16F 3/04; D06F 35/00
[52] U.S. Cl. ..................... 267/74; 68/23.1; 188/381; 267/134; 267/168
[58] Field of Search ............ 267/69, 73, 74, 134, 267/196, 202, 203, 140.1, 140.4, 166, 167, 168, 170, 174, 161, 182; 188/381; 248/610; 68/23.3, 23.1, 133; 210/144

[56] References Cited

U.S. PATENT DOCUMENTS

| | | | |
|---|---|---|---|
| 2,382,249 | 8/1945 | Megar | 267/170 X |
| 2,746,569 | 5/1956 | Castner | 188/381 |
| 2,957,331 | 10/1960 | Bruckman | 68/23.3 |

FOREIGN PATENT DOCUMENTS 2459912  2/1981  France .................. 188/381

Primary Examiner—Robert J. Oberleitner
Attorney, Agent, or Firm—Ernestine C. Bartlett

[57] ABSTRACT

An extensible suspension arm for damping the vibrations of the tub of a laundry washing and drying machine comprises a tension spring whose ends are connected to two suspension members, a damping member, and at least one stop providing a degree of freedom between the damping member and the suspension member to ensure that the damping action does not occur beyond a specific amplitude of the displacement between the two suspension members, damping being necessary only at high amplitudes during passage of the natural frequencies of the laundry washing machine.

3 Claims, 2 Drawing Sheets

SUSPENSION ARM FOR THE TUB OF A LAUNDRY WASHING MACHINE

FIELD OF THE INVENTION

The invention relates to an extensible suspension arm for damping vibrations of a tube of a laundry washing and drying machine, comprising a tension spring having ends attached to two suspension members, which tension spring is disposed in a tube of a first suspension member, which tube constitutes a first element of a damping means and is adapted to slide in a cylindrical casing which is rigidly connected to a second suspension member and which constitutes a second element of the damping means.

BACKGROUND OF THE INVENTION

It is common practice to suspend the tub of a washing machine in the chassis or the housing of the machine by means of elastic extensible devices such as springs and to absorb the vibration energy produced by the rapid rotation (spin-drying) of the drum loaded with laundry in the washing tub.

An example of such a machine is known from French Patent Specification No. 2,516,952. The suspension arm described in this Patent Specification No. 2,516,952 makes it possible to use a helical spring having bent ends which are hooked into eyes formed in suspension members and to promote the dissipation of the heat produced in the damper, the cylindrical casing which rubs against the tube being situated at the outside of the arm, so that its diameter can be as large as possible.

Said suspension arm has the drawback that it provides a constant damping regardless of the amplitude of the movement caused by the vibrations of the tub and regardless of the speed of rotation of the drum arranged in said tub.

As a matter of fact, a washing machine has a certain number of natural frequencies in its range of operating speeds. In particular, it has a first natural frequency in a range between 50 and 100 r.p.m. and a second natural frequency at approximately 200 r.p.m. At speeds below approximately 100 r.p.m. the exciting force is small. Since the damping cannot be too low because this is undesirable when higher critical speeds are exceeded, it is necessary to adjust the damping to the limit of fouling at a speed corresponding to higher natural frequencies.

Therefore a compromise is made, i.e. an intermediate value is selected for the damping force between the minimum and maximum damping force.

Another drawback of the constant damping is that at high speeds a substantial power is dissipated by the dampers. Since the possibilities of dissipating the heat are limited, this may give rise to very high temperatures, leading to a substantial wear, which prohibits the use of non-lubricated dampers. Therefore, it is necessary to provide a damping for the sole purpose of crossing the critical speeds.

The use of a constant damping also gives rise to additional noise associated with the transition frequency of the damping system.

SUMMARY OF THE INVENTION

It is an object of the invention to provide a substantial damping for the movement of the washing unit when the natural frequencies are crossed, during which the movement of the washing unit have substantial amplitudes, without damping the low-amplitude movements.

The suspension arm in accordance with the invention is characterized in that between at least one element of the damping means and the suspension member to which it is connected there is arranged a means which provides a specific longitudinal degree of freedom between said element and the suspension member. The damping means is loaded when the two suspension members exceed a specific amplitude to other side of the position occupied by the suspension arm when the drum in the tub does not rotate.

The suspension arm provides no damping during low-amplitude movements of the tub.

The suspension arm only provides damping when critical speeds are crossed and can provide a very strong damping at the exact instant at which this is necessary without the risk of premature wear.

In a special embodiment of the invention the means providing a degree of freedom between an element of the damping means and the suspension member to which it is connected comprises a substantially cylindrical body which is adapted to slide longitudinally along or on the tube and is clampingly engaged by the casing, the travel of said body being limited by a shoulder on the first suspension member and by a stop at the end of the tube, said body being also radially constrained by the casing.

Thus, the damping is provided between the cylindrical body and the casing, the degree of freedom being obtained by the fact that said body can slide freely on the tube of the first suspension member.

In another embodiment of the invention the means providing a degree of freedom between an element of the damping means and the suspension member to which it is connected is a cylindrical sleeve constituting an elastic means which is coupled to the element of the damping means at one of its ends and to the corresponding suspension member at its other end. Such an elastic sleeve can be arranged on one or on both suspension members and it has the advantage that the suspension arm can be of simple and economic construction.

In a preferred embodiment of the invention at least one elastic means is arranged between the cylindrical body and the first suspension member and its tube. The elastic means provide(s) stiffness for the relative movement of the body. It may be considered to damp this relative movement also to a small extent. The system then provides two damping actions.

In another special embodiment of the invention an elastic means is arranged between one end of the movable body and the first suspension member, or rather an elastic means is arranged between one end of the movable body and the stop.

Preferably, the elastic means is a helical spring. It is possible to use any other inexpensive means such as for example a buffer made of rubber, of a spongy metal or a synthetic foam. An elastic means can also be obtained by giving the ends of the cylindrical body, of the first suspension member or of the stop a specific shape.

In particular, a damping means is connected to the elastic means.

The invention also relates to a washing machine whose tub is suspended by means of suspension arms of the type described above.

DESCRIPTION OF THE PREFERRED EMBODIMENTS

The invention will now be described in more detail, by way of example, with reference to the accompanying drawings.

Figure 1:
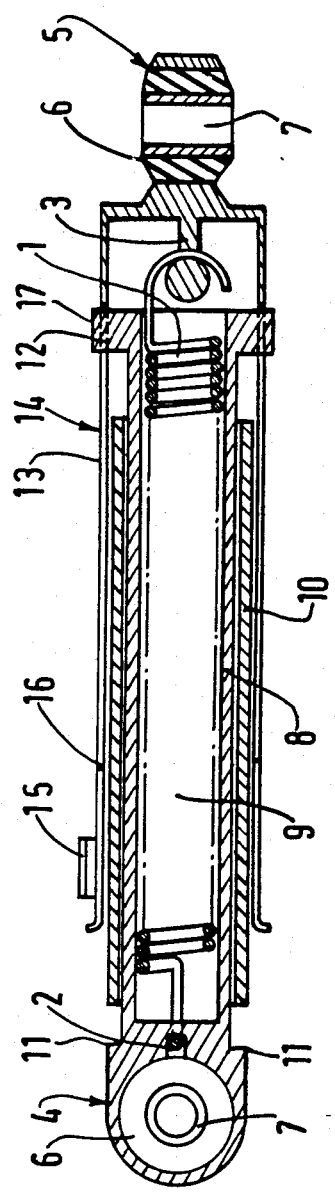
FIG. 1 is a longitudinal sectional view of the suspension arm.

FIG. 1 is a longitudinal sectional view of a suspension arm in accordance with the invention. The suspension arm is provided with a helical spring 1, which is arranged to operate as a tension spring and whose bent ends are hooked into holes or eyes 2 and 3 formed in two suspension members 4 and 5. In the Figures the suspension members 4 and 5 are provided with elastic sleeves 6 in which bearings 7 are mounted for attaching the arm to the tub and to the housing or chassis of the washing machine by means of a shaft. Any other method of pivotally connecting the suspension members 4 and 5 to the tub and the housing may be considered.

The suspension member 4 is integral with a tube 8 which extends substantially up to the suspension member 5 when the spring is relaxed, the spring 1 extending freely in the cavity 9.

A substantially cylindrical body 10 is adapted to slide concentrically along the tube 8 with a specific degree of freedom. The longitudinal displacement of the body 10 relative to the tube 8 is limited by a shoulder 11 formed on the suspension member 4 and by a stop 12 arranged opposite the suspension member, at the end of the tube 8.

At least two plates 13 constituting a casing 14 surrounding the body 10 are connected to the suspension member 5. The plates 13, which are preferably made of a metal, are shaped as, for example, cylindrical shells and enclose the body 10 over substantially its entire length when the spring is relaxed. Near its end facing the supension member 4 the casing 14 is clamped onto the body 10 by a clamping means in the form of an elastic ring 15 or a bracket formed by a blade spring. This clamping provides the friction enabling the suspension arm to convert the kinetic vibration energy into heat when the tub connected to this arm vibrates with high amplitudes. The casing 14 is slotted over substantially its entire length up to portion 16. The slot is engageable by a pin 17 which belongs to the stop 12 and which is free to move up to the portion 16, which limits the maximum travel of the arm.

Figure 2:
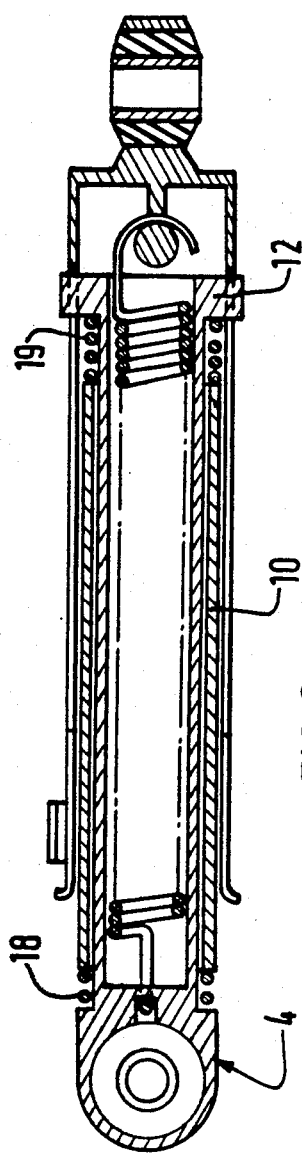
FIG. 2 is a longitudinal sectional view of the suspension arm provided with two elastic means for damping the body.

FIG. 2 is a longitudinal sectional view of the suspension arm provided with two elastic means 18, 19 which couple the tube to the body 10.

In a preferred embodiment of the invention the body 10, which is adapted to slide on the tube 8, is elastically coupled to said tube by two elastic buffers 18 and 19 which comprise two helical springs in the present embodiment.

For this purpose other means may be considered. The helical springs preclude shocks which may occur between the body 10 and the suspension member 4 or the stop portion 12 during operation of the suspension arm. A single elastic means may be adequate if the elastic means is mechanically coupled, either between the suspension member 4 and the body 10, or between the body 10 and the stop portion 12.

Figure 3:
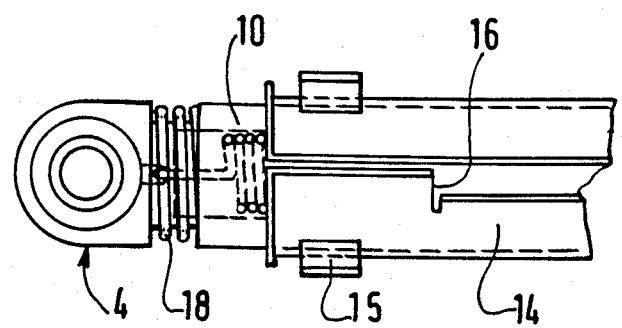
FIG. 3 shows a part of the suspension arm including a part of the casing.

FIG. 3 shows a part of the suspension arm comprising the elastic ring 15 which is tightened around the casing 14 to exert pressure on the body 10 and thus produce friction.

The suspension arm described with reference to FIGS. 1, 2, 3 and 4 operates as follows: The suspension members 4 and 5, which are connected to the housing and to the tub of the washing machine respectively, are only coupled to each other by the spring 1 and can therefore oscillate freely relative to one another under control of the spring force.

Thus, the cylindrical body 10 is movable along tube 8 between two stops 11 and 12, i.e. body 10 slides on the outer surface of tube 8. Additionally, the casing 14 clampingly engages the cylindrical body 10. In the case of only small vibrational movements between the tub and the washing machine housing, the body 10 slides over the tube 8 but will not reach the stops 11 and 12. The grip of the casing 14 on the body 10 does not change so that these movement are only damped by the friction between the body 10 and tube 8, if any. When the amplitude of the vibrations increases the movement of the body 10 relative to the tube 8 is limited by the stops 11 and 12 and further movement of the suspension members 4 and 5 relative to each other is only possible when casing 14 slides over cylindrical body 10. This sliding movement of casing 14 over body 10 provides the additional damping required when oscillations occur in the region of a natural frequency.

Figure 4:
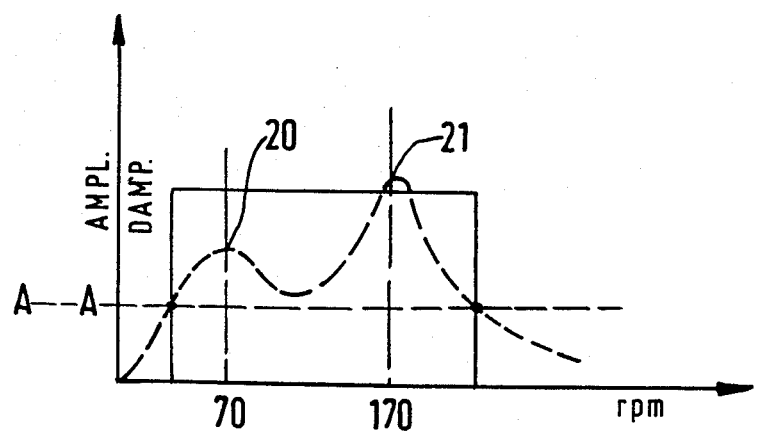
FIG. 4 is a curve representing the amplitude of the displacement of the tub of a washing machine as a function of the rotational frequency of the drum, in which curve the types of damping are indicated.

As is shown in FIG. 4, the variations in the amplitude of the tub displacement, indicated in broken lines, result, for example, in two critical speeds 20 and 21.

For low amplitudes the body remains rigidly coupled to the casing, so that there is no damping.

When the oscillation amplitude increases and exceeds the fixed threshold A, the body acts on the suspension member 4 and becomes disengaged from the casing 14. The body 10 and the casing 14 then rub against one another, thereby converting the kinetic oscillation energy into heat which is dissipated into the ambient atmosphere.

When the oscillation amplitude is below the threshold A after crossing the natural frequencies, it is no longer necessary to have damping. The damping, which is indicated in solid lines, no longer plays a part during the second crossing at high speeds of the threshold A, which represents a specific amplitude value.

In the present example of a suspension arm provided with two helical springs arranged between the suspension member 4 and the body 10, the displacement of the body relative to the suspension member is subject to a specific stiffness. It may be envisaged to provide an additional damping when this is of functional interest.

During high amplitudes two types of behaviour may be considered, depending on the stiffness of the two types of spring:

1. The abutment of the elastic means followed by a primary damping action.

2. The action of the body dictated by the stiffness of the compressed spring, the turns not adjoining one another.

What is claimed is:

1. An extensible suspension arm for damping vibrations of a laundry washing and drying machine, comprising a tension spring whose ends are attached to two suspension members, which tension spring is disposed in a tube of a first suspension member, which tube constitutes a first element of a damping means and is adapted to slide in a cylindrical casing which is rigidly connected to a second suspension member and which constitutes a second element of the damping means, wherein the damping means comprise a substantially cylindrical body which is adapted to slide longitudinally along the tube, the travel of said body being limited by at least one stop on said tube, and a clamping means of said casing whereby said cylindrical body is clampingly engaged by said casing.

2. A suspension arm as claimed in claim 1 wherein at least one elastic means is arranged between the cylindrical body and the first suspension member.

3. A suspension arm as claimed in claim 2 wherein the elastic means is a helical spring.

* * * * *